United States Patent [19]

Miller et al.

[11] 4,283,168
[45] Aug. 11, 1981

[54] THERMOPLASTIC FILM EXTRUSION APPARATUS

[75] Inventors: Douglas C. Miller; Terry W. Wolfe, both of Covington, Va.

[73] Assignee: Westvaco Corporation, New York, N.Y.

[21] Appl. No.: 75,229

[22] Filed: Sep. 13, 1979

[51] Int. Cl.³ ........................... B29D 7/04; B29F 3/04
[52] U.S. Cl. ................................ 425/465; 156/244.15; 156/244.25; 264/177 R; 425/376 A; 425/376 B; 425/381; 425/466
[58] Field of Search ..................... 425/465, 466, 376 R, 425/376 A, 376 B, 381; 156/244.25, 244.15; 264/177 R, 167

[56] References Cited

U.S. PATENT DOCUMENTS

| | | | |
|---|---|---|---|
| 2,387,718 | 10/1945 | Coleman | 425/466 |
| 2,514,211 | 7/1950 | Carlson | 425/465 |
| 2,821,746 | 2/1958 | Bicher, Jr. | 264/177 R |
| 3,142,090 | 7/1964 | Hoffman et al. | 425/466 |
| 3,191,228 | 6/1965 | Schluter | 425/376 A |
| 3,241,183 | 3/1966 | Tyrner | 425/466 |
| 3,482,278 | 12/1969 | Thompson et al. | 425/466 |
| 3,700,525 | 10/1972 | Violette et al. | 156/244.25 |
| 3,748,079 | 7/1973 | Moreno et al. | 425/466 |
| 3,854,859 | 12/1974 | Sola | 425/466 |

Primary Examiner—Jeffery R. Thurlow
Attorney, Agent, or Firm—W. Allen Marcontell; Richard L. Schmalz

[57] ABSTRACT

A viscous flow thermoplastic film is extruded as a variant thickness profile curtain by means of an extrusion die having a flow choke rod extending longitudinally parallel with the die jaws and positioned within one die jaw for chordal projection into the die flow channel. The choke rod is surface relieved by chordal flats at locations corresponding to film zones of greater thickness. A single rod may be provided with as many profile pattern sequences as space and dimension allows chordal segments around the rod circumference. Pattern selection may be changed under die running conditions by rotating the profile rod about its axis to align the flats of the desired pattern within the die flow channel.

10 Claims, 5 Drawing Figures

THERMOPLASTIC FILM EXTRUSION APPARATUS

BACKGROUND OF THE INVENTION

1. Field Of The Invention

The present invention relates to an apparatus for extruding thermoplastic material such as polyvinylchloride. More particularly, the present invention relates to apparatus for extruding a film of such plastic material in which the thickness of such film is increased along longitudinally extending zones at select zone locations across the film width.

2. Description Of The Prior Art

It is well known to the prior art that thermoplastic materials such as polyvinylchloride may be pressure extruded at viscous flow temperatures into extremely thin film sections. It is also well known to coat one or both surfaces of a paperboard substrate with such thin plastic film for the purpose of fabricating liquid cartons or containers.

Pursuant to the teachings of K. Thompson et al, U.S. Pat. No. 3,482,278 and Glenn M. Violette et al, U.S. Pat. No. 3,700,525, the strength of liquid containers is improved by applying a greater thickness of plastic film in those regions of the paperboard substrate web to be converted as the liquid container bottom.

Profiled variations in the thickness of an extruded plastic film began with the process itself; usually the unintentional result of a poorly formed or adjusted extrusion die lip. With the development of adjustable lip equipment, the lip opening along the die length (film width) was merely adjusted to a greater gap space in those areas where increased film thickness was desired. This technique allows only gradually tapered profile variations within the warp capacity of the adjustable lip element.

The patent disclosure of Thompson et al teaches an extruder apparatus design whereby the thickness profile of issued film is precisely determined by means of tapered relief zones cut into the adjustable lip or jaw of an extrusion machine.

The Violette et al apparatus accomplishes the same result by means of a threaded rod having a profiled thread root disposed symmetrically between oppositely facing die jaws within the extruded flow channel.

Although both, the Violette et al and Thompson et al profiling techniques and apparatus are more effective than warping the die lip, it will be noted that such techniques lack flexibility in terms of changes between profile patterns. In the case of the Thompson et al device, the entire adjustable lip of the die assembly must be changed. Violette et al requires that the profiling rod be exchanged for another of different profile pattern. In either case, operation of the extruder equipment must cease to permit a partial disassembly of the die. Depending on the frequency of occurrence, such operational interruptions present a major obstacle to the practice of any profiling technique.

Due to the fact that extrusion temperatures range from 200° to 250° F., several hours are required to cool the entire mass of the extruder assembly sufficiently to permit the required work. Moreover, each element that is removed from the assembly must be thoroughly cleaned prior to re-assembly. As much as an entire production day may be lost for the singular reason of changing a profile pattern.

It is, therefore, an object of the present invention to teach the construction of an extruder die apparatus whereby the machine may be adjusted to lay any of several profile patterns without interruption of the machine operation.

Another object of the present invention is to teach the construction of an extruder die apparatus that requires no disassembly of the die for the purpose of profile changes.

SUMMARY OF THE INVENTION

The extruder die of the present invention is provided with a profiling rod set asymmetrically into one of the die jaw faces. Only a small chordal portion of the profiling rod projects into the flow cavity between the jaw faces. Consequently, flow relief zones in the profile rod surface continuity require only a chordal segment of material removal from the rod surface at the desired location.

Depending on the size of rod to be accommodated, two or more profile patterns may be cut into the profile rod surface across different arcuate segments of the rod circumference.

Change of the desired profile pattern requires no more than an axial rotation of the rod to align the desired pattern within the extruder flow cavity. Such changes may be made while the machine is hot and running with no loss in productivity.

BRIEF DESCRIPTION OF THE DRAWING

Relative to the drawing wherein like reference characters designate like or similar elements or components throughout the several figures of the drawing.

DESCRIPTION OF THE PREFERRED EMBODIMENT

Figure 1:
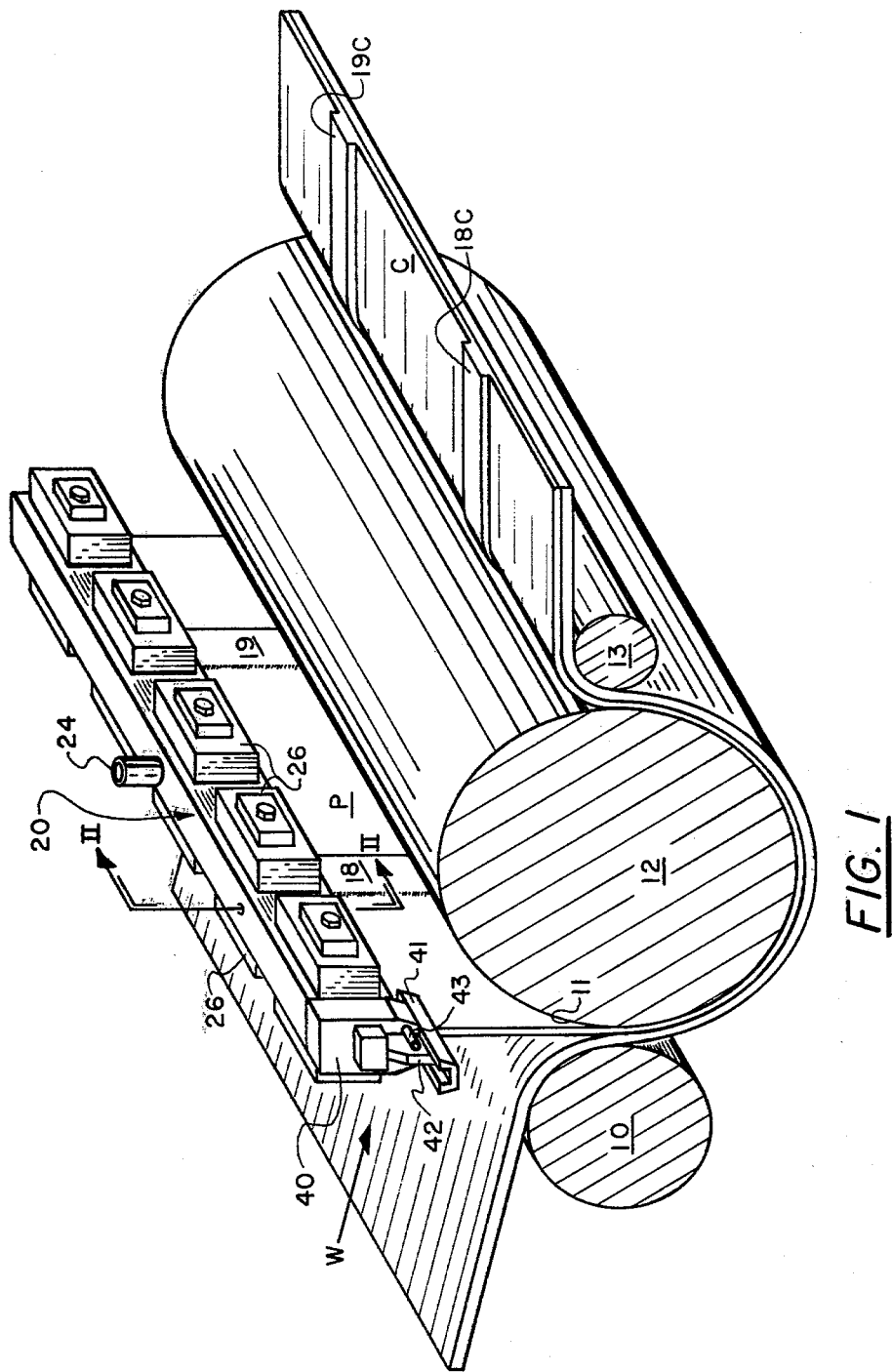
FIG. 1 is a perspective view of the invention in operational combination with a paperboard web substrate.

The illustration of FIG. 1 represents that segment of a paperboard coating machine whereat plastic film is applied to a paperboard surface. An indefinite length paperboard web W is drawn from a supply reel not shown and turned about a first turning roll 10 into a nip 11 between the turning roll 10 and a chill roll 12.

Also entering the nip 11 is a film P of viscous flow, hot thermoplastic material extruded from an extruder die assembly 20. Upon contact, the plastic partially penetrates the paper fiber of the web W for a secure bond therewith. Simultaneously, the chill roll 12 draws heat from the film coating to solidify a surface texture derived from that of the roll 12 surface.

The resultant plastic and paperboard composite c is stripped from the chill roll surface by a second turning roll 13 and directed into subsequent operations.

Pursuant to an objective of the invention, the film P from the die assembly 20 is thicker at designated lateral locations 18 and 19 than at other portions across the film width. Such thicker portions 18 and 19 ideally form correspondingly thicker zones 18c and 19c on the composite c. In fact, however, this does not occur due to greater absorption by the paperboard of the greater plastic quantities within the zones 18 and 19. At less than fiber saturation levels, no actual dimensional profile in the composite c occurs. Such a condition is illustrated by FIG. 1 for purposes of instruction and understanding of the invention which is directed to the method and apparatus for issuing the thicker zones 18 and 19 as illustrated by the remaining figures.

The flow mechanics whereby a greater weight of viscous flow plastic is issued along one segment of a pair of uniformly spaced extrusion die lips is best explained by the aforedescribed Thompson et al and Violette et al patent disclosures. It is sufficient for this disclosure to merely repeat the fact that a localized increase in the extrusion flow channel above the die exit lips will provide a correspondingly greater flow rate of plastic per unit length of die.

Figure 2:
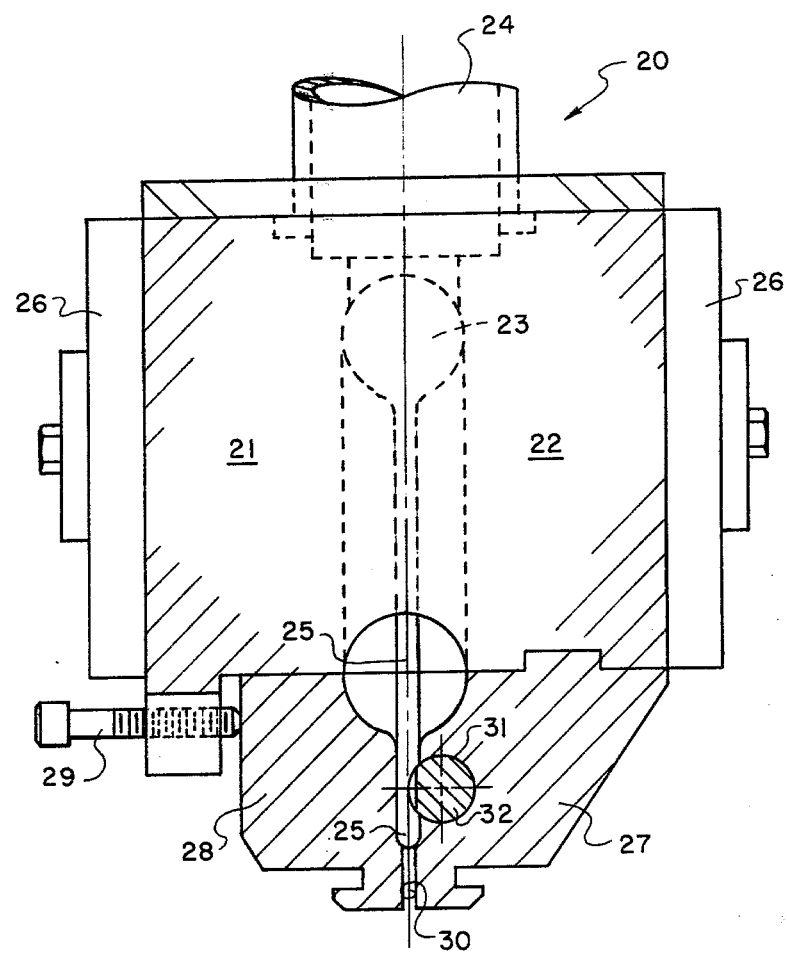
FIG. 2 is a sectional end view of the invention as seen along the cut plane II—II of FIG. 1.

Relative to FIG. 2, the extruder die 20 is seen as an end section cut at plane II—II in FIG. 1. General construction features of such dies 20 comprises two body halves 21 and 22 having an inverted V-shaped manifold 23 for uniform distribution of viscous flow plastic from a central supply conduit 24 into an extrusion slot 25 extending the die length. Along the exterior sides of the respective die body halves are positioned electrical heater elements 26 which keep the die mass at the desired temperature.

Below the die body halves are jaws 27 and 28, stationary and adjustable, respectively. A suitable adjustment mechanism such as jack screw 29 is provided to set the relative proximity between the respective jaws 27 and 28 at the extrusion orifice 30 therebetween.

Distinctive of the invention, one of the jaws, preferably the stationary jaw 27, is provided with a longitudinally extending cavity 31 dimensioned to receive a corresponding profile rod 32 therewithin. The depth of cavity 31 is made to position a chordal segment 33 (FIG. 3) of the rod 32 sectional circumference within the slot 25 volume space.

Figure 3:
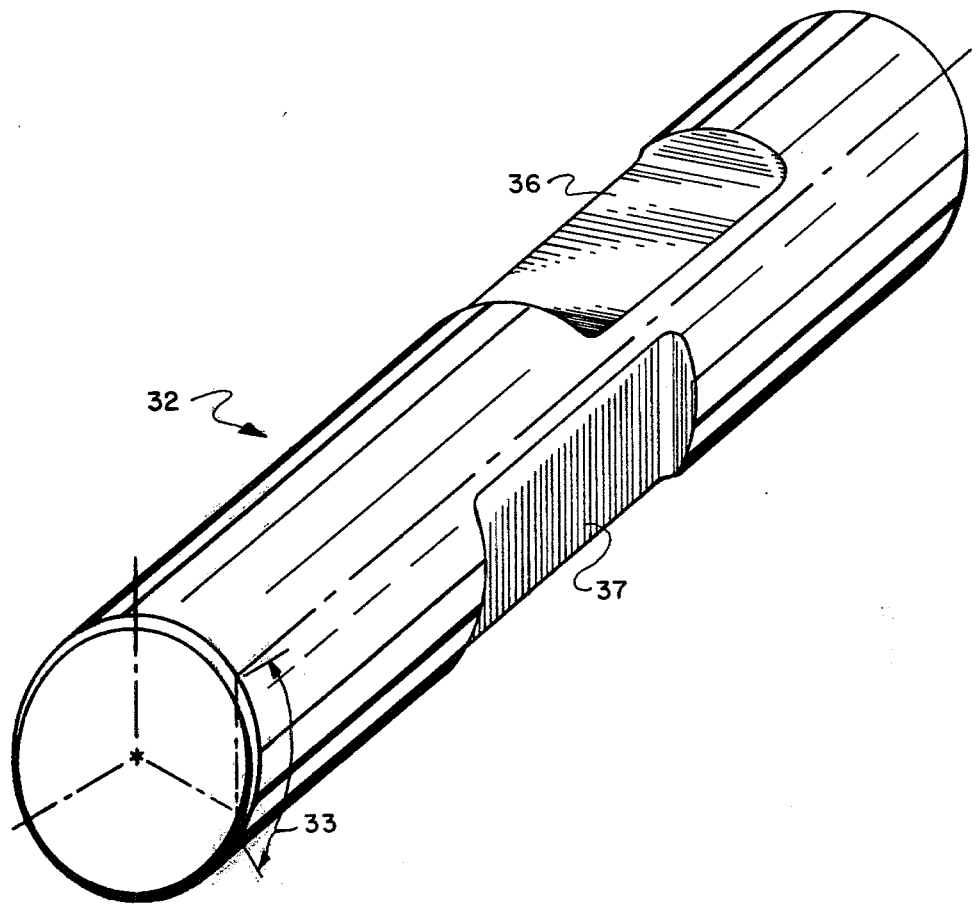
FIG. 3 is a perspective view of a profiling rod in accordance with the present invention.
Figure 5:
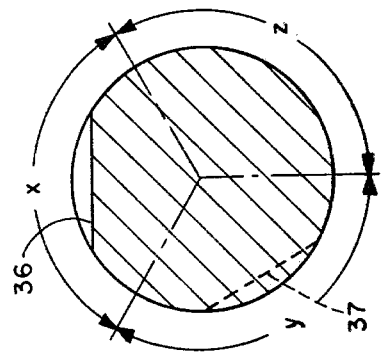
FIG. 5 is a sectional end view of the present invention profile rod as seen along cut plane V—V of FIG. 4.
Figure 4:
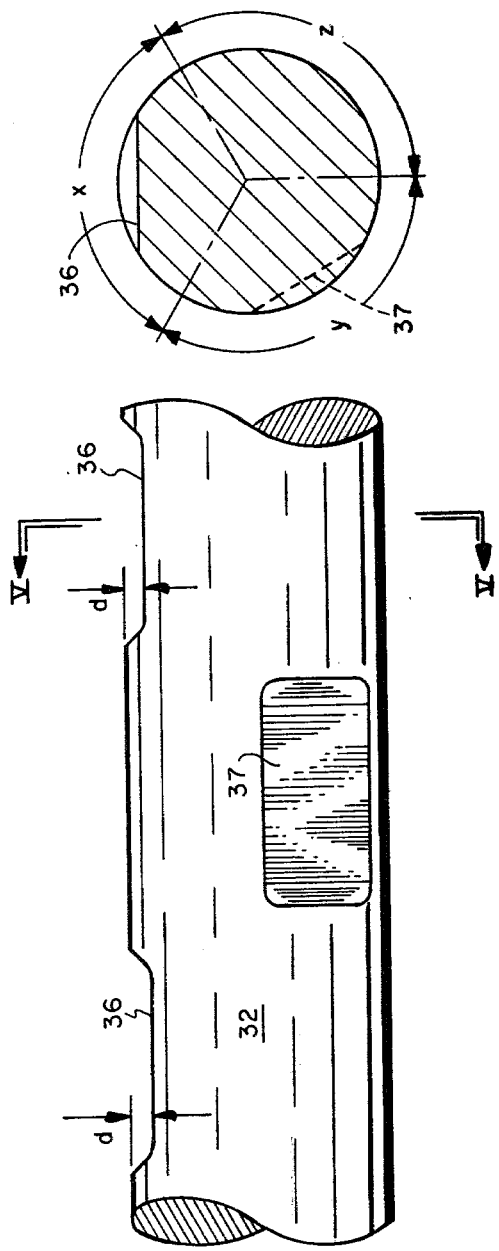
FIG. 4 is a side view of the present invention profile rod.

Referring particularly to FIGS. 3, 4 and 5 and further to the description of the present profile rod 32, the sectional circumference of the rod 32 is divided into three, 120° segments, X, Y and Z: each segment extending along the rod length parallel with the rod axis. Within the circumferential arc of segments X and Y, chordal flats 36 and 37 are cut, respectively, to a maximum depth d determined by the desired thickness of the thick film zones 18 and 19. The lateral length and spacing of flats 36 along segment X may be unrelated to the length and spacing of flats 37 along segment Y. In terms of products the flats 36 along segment X may be cut to conform with the most efficient container blank pattern for quart volumes. See Thompson et al patent disclosure. On the same rod element 32, flats 37 along segment Y may be cut to conform with the most efficient container blank pattern for half-gallon volumes.

The third or Z segment of the rod 32 may be cut with flats to conform with a third pattern or, as shown, merely left undisturbed to lay a film of uniform thickness along the entire die length.

Since the chordal segment 33 projecting into the slot 25 volume space is equal to or less than the chordal segment of arcs X, Y and Z, the rod 32 may be rotated about its longitudinal axis to align the flats of any particular segment with the walls of slot 25. In such selected position, the undisturbed cylindrical surface elements of the rod 32 uniformly choke the plastic flow to the desired base thickness. In the flow regions of the flats however, the choke is relieved allowing greater flow quantities. When turned to a different 120° segment alignment, the film base thickness remains constant, there being a change in the location and perhaps thickness of the thick zones 18 and 19.

By extending one end of the rod 32 through the die assembly end cap 40 (FIG. 1) for external accessibility, the desired profile pattern and rod segment, X, Y or Z may be selected at will under running conditions.

On some die designs having an adjustable deckle 41 positioned by a housed pinion 42, it may be necessary to provide a geared off-set drive 43 for external control over the rod 32 rotational position.

Although the profile rod 32 of the present invention has been described in terms of three, 120° profile segments, it should be recognized by those of ordinary skill in the art that the invention is not limited to this particular geometry. The circumference of the rod 32 may be divided into as many segments as desired, each segment being cut and dedicated to a distinct profile pattern. Only normal and customary design restraints such as maximum profile rod 32 diameter and minimum chordal segment 33 projection limit the number of profile segments available along a given rod.

It will be noted by those of ordinary skill in the art that the preferred embodiment of our invention has been described relative to a paperboard coating process and apparatus. Obviously, the invention may also be exploited independently of a substrate to lay a homogeneous film of variant thickness profile. In such an application, the viscous film curtain P would be deposited directly on the surface of chill roll 12 for immediate cooling, solidification and subsequent stripping.

Having fully described our invention,
We claim:

1. A thermoplastic film extrusion die having a viscous flow channel between a pair of opposed die jaw faces, one such jaw having a bore channel formed longitudinally therein to receive an axially elongated cylindrical rod means therewithin having a substantially smooth cylindrical surface, a chordal segment of the circular section of said rod projecting beyond said one jaw face partially into said flow channel to form a zone of open but restricted flow area extended continuously along the length of said flow channel between said smooth cylindrical surface and said other jaw face, said smooth cylindrical surface being interrupted at select locations along the length thereof by cordal flat means to increase the flow area and reduce the restriction to thermoplastic flow in said channel past said rod means in regions of said channel adjacent said chordal flat means.

2. An extrusion die as described by claim 1 wherein said chordal flat means comprises a substantially flat plane formation extended across a chordal segment of said rod section and extended axially parallel along said rod means less than the length thereof.

3. Extrusion die means as described by claim 1 wherein the circular section said cylindrical rod means is divided into a plurality of arcuate segments extended axially therealong, first and second chordal flat means being formed within the circular arc of respective arcuate segments.

4. Extrusion die means as described by claim 3 wherein said first flat means includes a plurality of flat plane formations within a first arcuate segment having a first axial separation distance therebetween and said second flat means includes a plurality of flat plane formations within a second arcuate segment having a second axial separation distance therebetween.

5. Extrusion die means as described by claim 4 comprising drive means to rotate said rod means about the axis thereof for alignment of first flat means within said flow channel.

6. A thermoplastic film extrusion die means having a viscous flow channel between a pair of spaced die jaws terminated between spaced, parallel extending die lips, the improvement comprising axially elongated and rotatable rod means positioned within one of said die jaws asymmetrically of said flow channel to project an axially extended first arc segment thereof partially into said channel, first sectional portions of said arc segment having first axial length projecting a first distance from a channel face of said one die jaw into said flow channel to provide a first flow area and viscous flow restriction in said channel between said rod means and the other of said die jaws in channel regions adjacent said first sectional portions, and second sectional portions of said arc segment having second axial length and projecting a second distance from said one die jaw face into said flow channel to provide a second flow area greater than said first flow area and viscous flow restriction less than said first flow restriction.

7. Extrusion die means as described by claim 6 comprising drive means to axially rotate said rod means within said one die jaw from a first axial position respective to alignment of said first arc segment within said flow channel to a second axial position respective to alignment of a second arc segment of said rod means within said flow channel under extruding operating conditions.

8. Extrusion die means as described by claim 7 wherein the projection distance of said second sectional portion is substantially the same as the projection distance of said first sectional portion within said first arc segment to provide a substantially constant flow area and viscous flow restriction between said rod means and said other die jaw.

9. Extrusion die means as described by claim 7 wherein the axial length of said first sectional portions within said first arc segment is distinctive from the axial length of first sectional portions within said second arc segment.

10. Extrusion die means as described by claim 7 wherein the axial length of said second sectional portions within said first arc segment is distinctive from the axial length of second sectional portions within said second arc segment.

* * * * *